(12) United States Patent
Ritter et al.

(10) Patent No.: US 7,680,783 B2
(45) Date of Patent: Mar. 16, 2010

(54) CONFIGURABLE SEARCH STRATEGY

(75) Inventors: Gerd Martin Ritter, Heidelberg (DE); Volkmar Stegmann, Altlussheim (DE)

(73) Assignee: SAP AG, Walldorf (DE)

( * ) Notice: Subject to any disclaimer, the term of this patent is extended or adjusted under 35 U.S.C. 154(b) by 228 days.

(21) Appl. No.: 11/617,116

(22) Filed: Dec. 28, 2006

(65) Prior Publication Data

US 2008/0162447 A1 Jul. 3, 2008

(51) Int. Cl.
*G06F 7/00* (2006.01)
*G06F 17/30* (2006.01)
*G06F 17/00* (2006.01)

(52) U.S. Cl. ....................... 707/4; 707/104.1
(58) Field of Classification Search ........................ None
See application file for complete search history.

(56) References Cited

U.S. PATENT DOCUMENTS

| | | | |
|---|---|---|---|
| 5,983,170 A * | 11/1999 | Goodman | 704/9 |
| 7,003,764 B2 | 4/2003 | Allison | |
| 6,745,181 B1 * | 6/2004 | Chang et al. | 707/4 |
| 2006/0122872 A1 * | 6/2006 | Stevens et al. | 705/5 |

\* cited by examiner

*Primary Examiner*—John R Cottingham
*Assistant Examiner*—Mariela D Reyes
(74) *Attorney, Agent, or Firm*—Kenyon & Kenyon LLP

(57) ABSTRACT

Systems and methods are described that permit a user to configure an identification strategy at run time to facilitate user input of data. The identification strategy may include a parsing grammar and a search algorithm. The parsing grammar may be used to parse user input, and the search algorithm may be used to search a database for the user input. A configuring user may configure the parsing grammar at run time to accept data in a customized form to suit the user's input style. The search algorithm may be configured accordingly as well.

24 Claims, 8 Drawing Sheets

CONFIGURABLE SEARCH STRATEGY

BACKGROUND

Computer user interface forms provide a method of entering data into a computer system. These predefined forms typically include various interface components, including fields where the user enters text. Because computers require rigid precision in the data that they process and humans are often limited in their ability to recall the precise input required, software designers implement facilities to assist users in filling in the precise data required. These facilities often receive user input, parse the input into a computer-understandable form, and perform a search in a database of valid input data for likely matches. Once a match is found, the user instructs the system to fill in the field with the match. For example, on many airline booking sites, the user enters text into free form fields. These fields may be the departure and destination airports for the flight search. These sites generally require a unique three-letter code to be entered for the airports. However, the form fields sometimes permit the user to enter the unique code, a city name, a city and state, or a point of interest. The system then searches allocated database(s) for any matches to the user input and presents the user with possible matching airports from which the user may select. Once the user makes a selection, the system fills in the data and submits the form with the selected airport codes.

A problem arises because users may enter data differently. Even a slight change in the form of the input may prevent the parser from parsing the free form input and hence prevent the system from matching the input. For example, one individual may enter a city and state as [city], [state] while another individual may enter [state]: [city]. If the latter format is not anticipated by the software developer, the system will be unable to parse the input. Therefore, systems and methods are desirable that permit a user to configure an input parser and search algorithm at run time to customize the way that data is input into the system.

BRIEF DESCRIPTION OF THE DRAWINGS

FIG. 5b illustrates an exemplary interface of the present invention.

DETAILED DESCRIPTION

Systems and methods are described that permit a user to customize, e.g., at run time, the way that a computer system parses and searches for user input. The system may receive changes to an identification strategy, which may include at least one parsing grammar and at least one searching algorithm. The system may update the identification strategy based on the changes. When the system receives input data, it may parse the input data using the updated parsing grammar and search a database for the appropriate data using the updated search algorithm.

Figure 1:
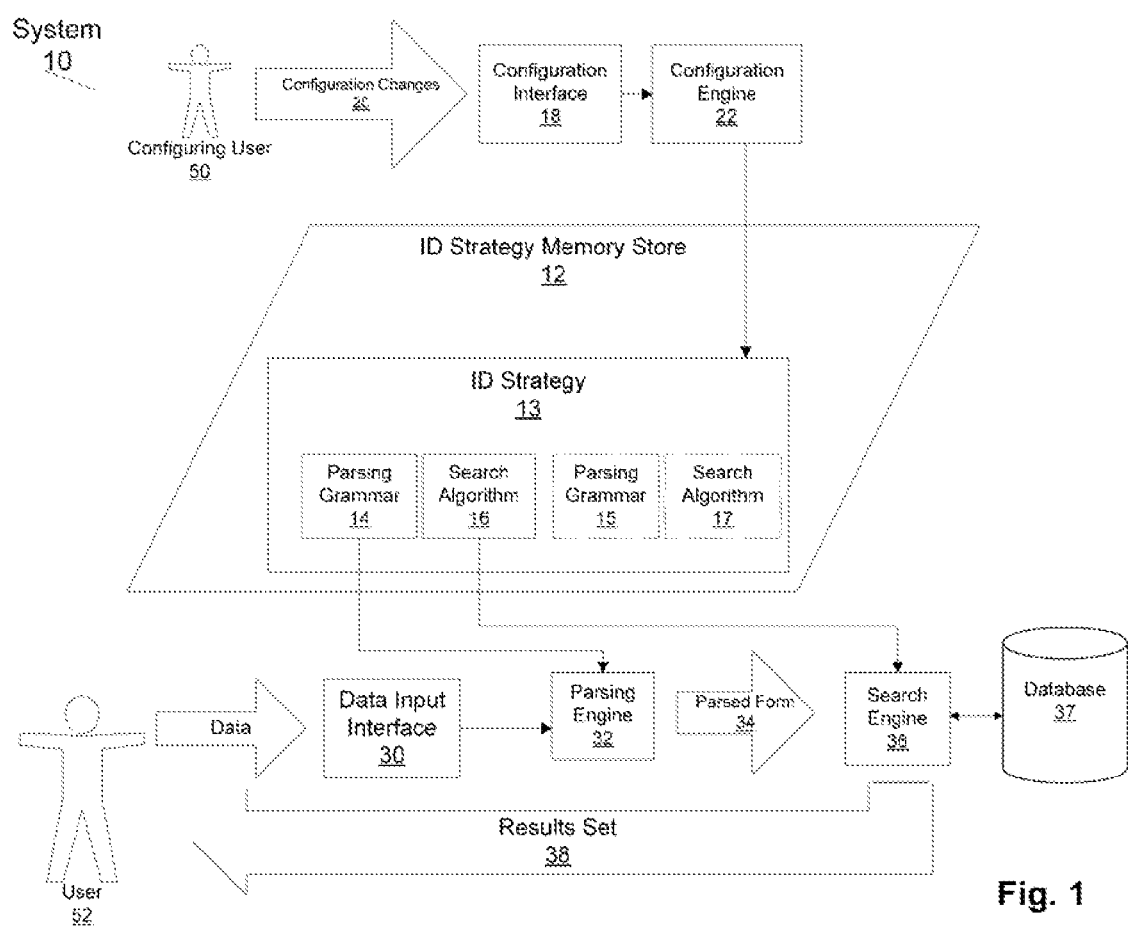
FIG. 1 illustrates a block diagram of an exemplary system of the present invention.

FIG. 1 depicts an exemplary system 10 of the present invention including a identification strategy memory store 12, a configuration interface 18, a configuration engine 22, a data input interface 30, a parsing engine 32 and a search engine 36. The identification strategy memory store 12 may store an identification strategy 13. The identification strategy 13 may include pairs of parsing grammars and search algorithms, such as parsing grammar 14 and search algorithm 16. The configuration engine 22 may make changes to the identification strategy 13 based on user changes received from the configuration interface 18. The configuration interface 18 may present an interface that allows the parsing grammar 14 and the search algorithm 16 to be altered at run time. Once the identification strategy 13 is updated, it may be available for parsing and searching.

When searching for user input data from input data interface 30, the parsing engine 32 may parse the data according to the parsing grammar 14 into a parsed form 34. The search engine 36 may search a database 37 in accordance with the search algorithm 16 for the user input data based on the parsed form 34. The search engine 36 may collect the results of the search in a results set 38 that may be returned to the user.

By allowing changes to the identity strategy 13 to be updated at run time, the system may be customized to the particular users who will be entering data. This feature may make user interfaces more user friendly and compatible with styles of user input in various situations. For example, users in one organization may be accustomed to entering names as [first name] [last name] while others in another organization may be used to entering [last name], [first name]. In another example, a user may typically enter names as [first initial] [last name]. No matter the style, the present invention may permit the system to be customized to support the entry style at run time. The system may be customized by a software developer, system administrator, and/or end user. Some systems may be protected by the system administrator to protect the integrity of the system from undesirable user changes.

The interface 30 may exist in various applications, such as email applications, web page applications, order fulfillment tools, and the like. The text input field may exist to enter various types of data. This data may be entered in a form different than the form required by the tool for which the interface is a part of. For example, an email address entry field in an email program may accept first and last names to be entered and may match the entry with the individual's email address.

Both the identity strategy memory store 12 and the database 37 may exist as volatile memory, solid state data stores, such as on hard disk, or may be non volatile memory, such as RAM, memory. Both memory stores may exist as databases of various types, including as relational databases, object oriented databases, flat file databases, or the like. Both memory stores may exist as unitary databases or may be distributed over various database servers. For illustrative purposes, the identity strategy memory store 12 is a flat file database and the database 37 is a relational database.

The identity strategy 13 may be a collection of pairs. Each pair may include a parsing grammar 14 and a search algorithm 16. As shown in FIG. 1, there may be multiple pairs, such as additional pair of parsing grammar 15 and search algorithm 17. While the identity strategy 13 has been depicted as one to one pairs of parsing grammar to search algorithm, there may be various relationships between parsing grammars and search algorithms, such as one to many (in which a single parsing grammar is paired with multiple search algorithms), many to one, and many to many. For illustrative purposes, the identity strategy is depicted as one to one pairs.

Parsing grammar 14 may include various rules used to parse user data. The parser may include lexical analyzing rules responsible for breaking user input data into tokens. Tokens may be grouped into categories called token types. For example a parsing grammar may include rules to parse email addresses. A lexical rule may exist that breaks an input (such as employee@mycompany.com) into "employee", "@", and "mycompany.com". Each broken down portion may be designated a token. The tokens may be of [name], [separator], and [domain] token types respectively. The tokens may be the actual string literal, and the token types may be the categories to which those string literals belong.

In an embodiment, the parsing rules may exist in an expression form. This form may include various symbols that instruct the parsing engine 32 how to parse the input. Among other methods of input, the configuration interface may permit a configuring user to enter the rules in expression format. The symbols of expression format may include:

*—may represent one or more alphanumeric characters

+—may represent at least one alphanumeric character.

?—may represent exactly one alphanumeric character

[—may begin a label for a token type

]—may end the label for the token type.

Any remaining character not above may represent itself.

For example, the expression "*[last name]; *[first name]" may match input where zero or more alphanumeric characters (representing a last name) is followed by a ';' and is followed by zero or more alphanumeric characters (representing a first name). Exemplary matching input strings may be "x;x", ";x", "x;", and "abc;123". Similarly, the expression "?????" may match any input string of exactly five alphanumeric characters. In practice, any expression format may be used to represent rules of parsing grammar 14. For example, the regular expression format may be implemented to parse user input. See http://www.regular-expressions.info/reference.html for a description of this format.

In an embodiment, a user may input text (i.e., in a real text field), identifiers and/or codes. The input is then parsed and/or searched.

In an embodiment, the parsing rules may be multi-level, such that the parsing engine 32 may make more than one pass to parse the user input. The parsing grammar may include multiple rules, one rule to parse each level of input. For example, to parse a string of email addresses, a first rule may parse the user input string into individual email addresses by matching a separator, such as ','. Each portion preceding the ',' may be a separate email address. Likewise, the final portion after the ',' may also be an email address. A second rule may parse the email addresses into tokens of token types [name], [separator], and [domain].

The parsed form 34 may be a set of tokens derived from the user input data by the parsing engine 32 organized in a logical fashion. The parsed form may be transmitted to the search engine 36 where the parsed form 34 is used in the search algorithm 16 to search for the user input data. For example, referring to the illustration above, the parsed email string may result in a parsed form organized as a set of triplet pairs. Each triplet may correspond to the three portions of an individual email address (token name, separator, and domain). Each pair of the triplet may include the token type and the actual token string literal. For example, for the input string "name1@mycompany.com, name2@mycompany.com, name3@mycompany.com", the first triplet may be [name], name1, [separator], '@', [organization], mycompany.com.

The search algorithm 16 may be a set of rules for searching the database 37 for the parsed form 34. The search engine 36 may incorporate the parsed form 34 into the rules of search algorithm 16 and formulate queries. The search engine 36 may then execute the search queries on the database 37. In one embodiment, the queries may be SQL statements. The rules may be preliminary forms of the SQL statements that include placeholders where the tokens will be inserted. For example, a preliminary SQL statement used to search for email addresses may be "Select FullName from Contacts_Table where name=[name] and organization=[organization]. The search engine or algorithm may retrieve the first triplet from the parsed form 34 of the above example and replace [name] and [organization] in the SQL preliminary form with the actual, corresponding tokens. Once the replacements have been made, the SQL query may be "select FullName from Contacts_Table where name='name1' and organization='mycompany.com'". The SQL query may be executed on the database 37. Once the results have been obtained, the search engine 36 may move to the next triple. Once the search results have been gathered, they may be placed in a results set 38 and returned to the user.

Figure 2:
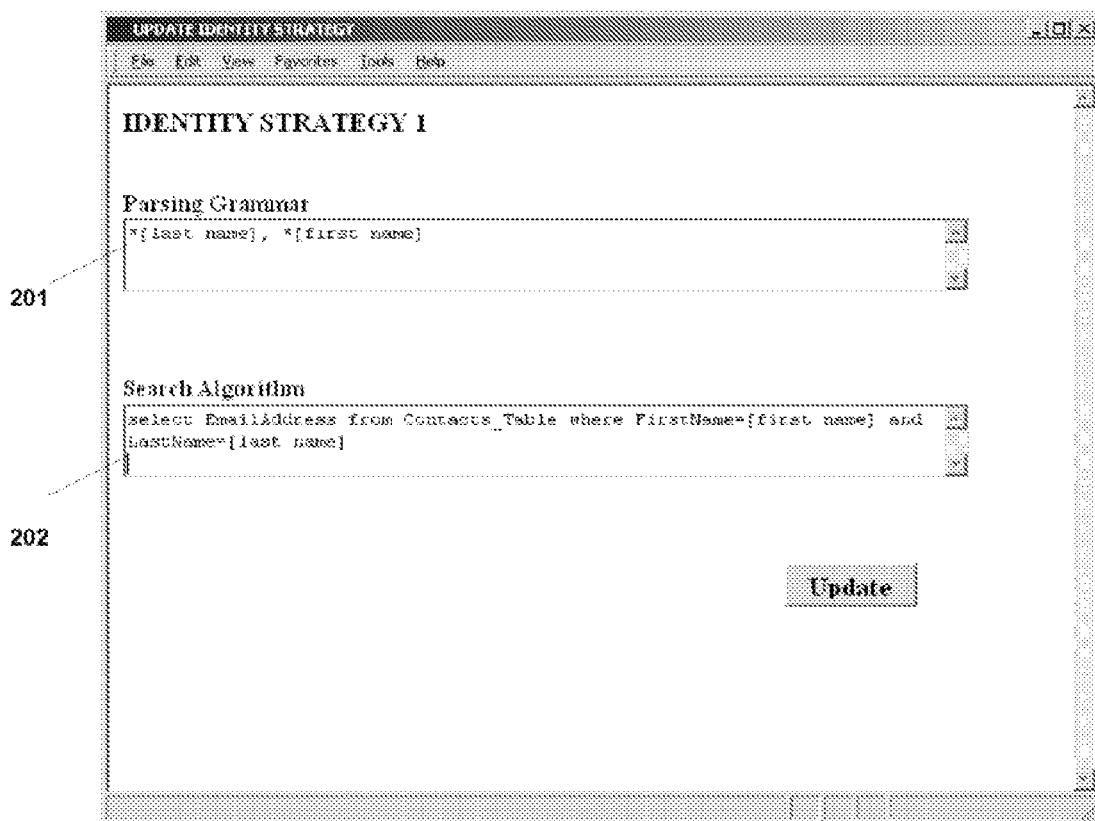
FIG. 2 illustrates an exemplary interface of the present invention.

The configuration interface 18 may present an interface to a configuring user to make changes to the parsing grammar. In one embodiment, as described, the configuring user may be presented with an input field allowing the configuring user to make changes to the parsing grammar by modifying the expression form (as shown in FIG. 2). The parsing grammar input field 201 includes the parsing grammar associated with Identity Strategy 1. The configuring user may update the parsing grammar by editing the field 201 and clicking "Update". Likewise, the user may update the search algorithm by editing the input field 202 and clicking "Update".

Figure 3A:
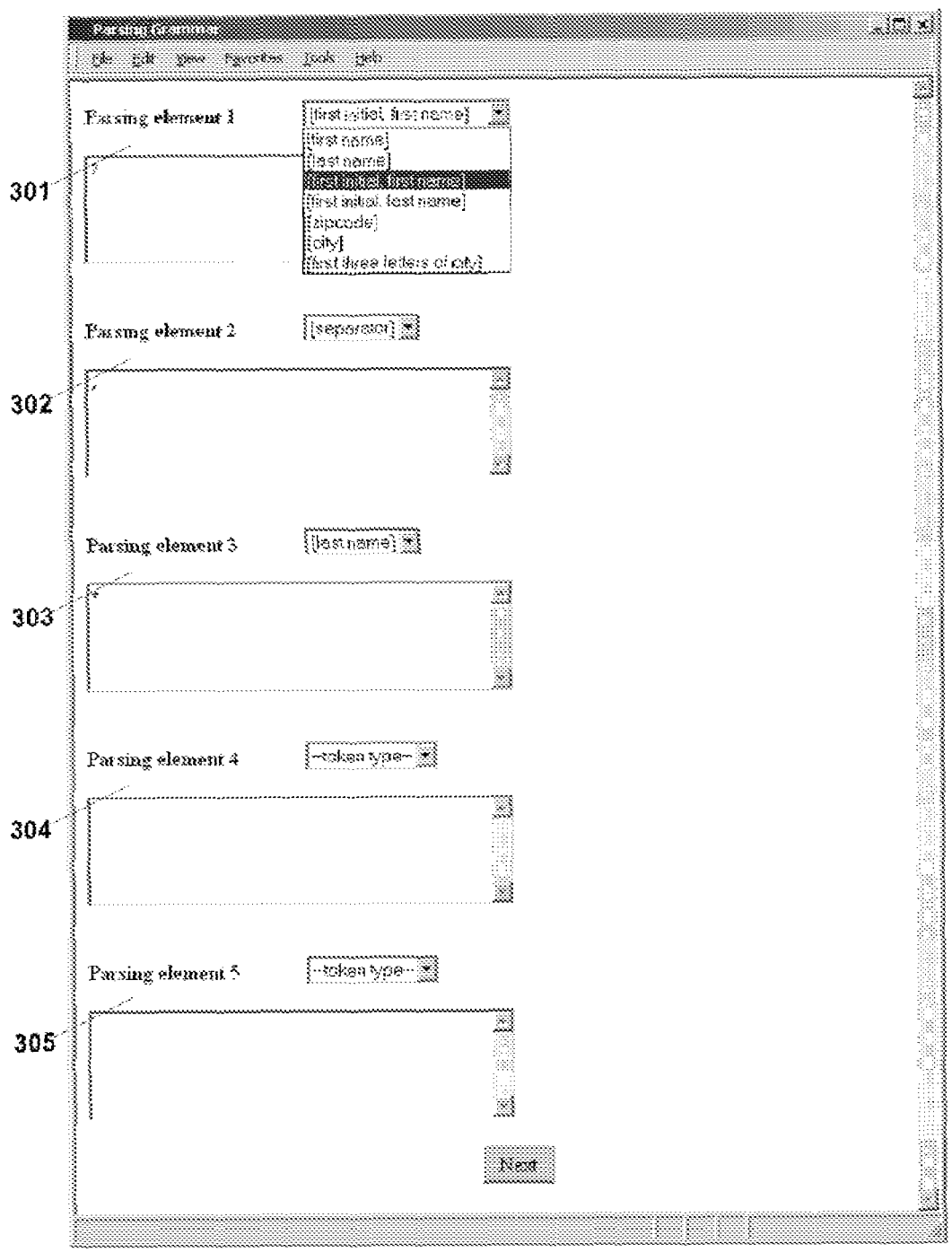
FIG. 3a illustrates an exemplary interface of the present invention.
Figure 3B:
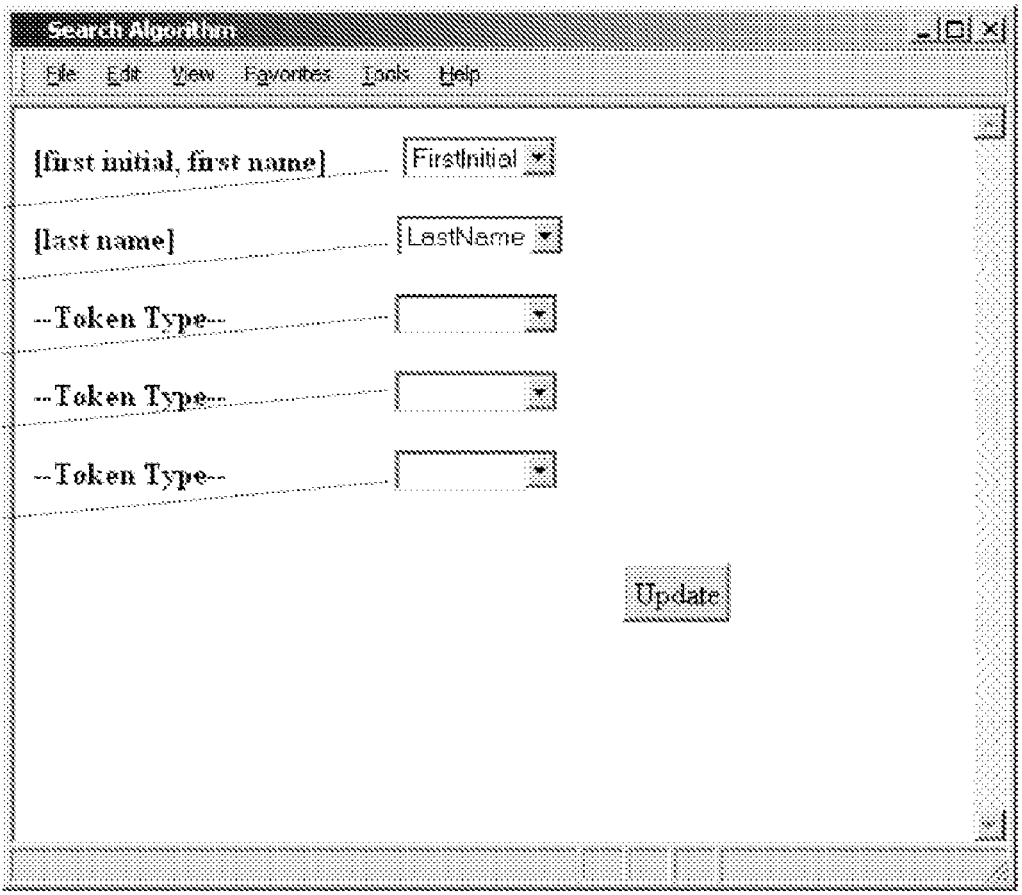

In an embodiment, the configuration interface 18 may be implemented as shown in FIGS. 3a and/or 3b. FIG. 3a illustrates an interface that may permit a configuring user to update a parsing grammar. FIG. 3b illustrates an interface that may permit the configuring user to update the corresponding search algorithm. Each drop down list may include token types designating how the parsing grammar will be constructed. For example, the first list 301 may include token types [first name], [last name], [first initial, first name], [first initial, last name], [zip code], [city], [first three letters of city], etc. Selecting one option sets the parsing grammar to look for that token type in the position corresponding to the list. For example, if [first initial, first name] is chosen for the first list, the parsing grammar may create an expression whose first portion is a '?'. A '?' may be chosen because it represents exactly one character and the first initial token type is one character as well. The '?' may be associated with the token type label [first initial, first name], such as ?[first initial, first name]. Or, for example, if [first three initials] is chosen in the first list, the interface may generate a parsing grammar that begins with "???", indicating that the first three characters of any user input will be associated with the [first three initials] token type.

The drop down list may additionally include a [separator] token type (as shown in the second list 302). The [separator] token type may permit the user to enter characters, such as a comma separator, to mark the boundary between tokens.

Once the configuring user has selected the parameters for the parsing grammar, the configuring user may click "Next" to proceed to the search algorithm update screen (as shown in FIG. 3b). The search algorithm update screen may present the user, for example, with a series of drop down boxes, each associated with a token type from the parsing grammar. Each drop down list may include database fields. Selecting a particular field to be associated with a token type may indicate that the algorithm will search the field for the token whose token type matches the token type of the label. For example, list 351 includes a field called FirstInitial selecting this field type may instruct the search engine to search the database field FirstInitial for the token associated with the token type [first initial, first name] found in the parsed form.

The configuration interface 18 may gather the updates to the parsing grammar and the search algorithm and send them as changes 20 to the configuration engine 22. Configuration engine 22 may update the identity strategy 13 in the identity strategy memory store 12 to reflect the changes 20. Once the identity strategy 13 has been updated, the system may process user input data using the updated identity strategy.

In an embodiment, the identity strategy may be stored in a configuration file. The configuration file may include a portion that stores a parsing grammar and a portion that stores the associated search algorithm. The configuration file may be read from memory by the configuration engine 18 to incorporate the configuring user changes and written back to memory once the update has been completed. The parsing engine and search engine may read the configuration file from memory when invoked. In this way, the system may parse the user input data and search for that data in a manner that reflects the changes made by the configuring user.

In an embodiment, the configuring user responsible for updating the identity strategy via the configuring interface, and the user who inputs the user input data may be the same person. In this way, a user who uses the system may customize the way that the system may receive input to best suit the user's specific style.

In an embodiment, the search algorithm may be a portion of executable code. The tokens derived from the parsed form may be incorporated into the code when executed so that the search may be performed on the user input data. For example, the code may be code that is interpretable at run time, such as JavaScript, PHP, or Perl code. The search algorithm may be a routine that is designed to perform a search on the database 37. For example, the code may be designed to retrieve a set of data and to perform a hashed or quick sort on the data. The code may include place holders that mark where tokens may be inserted. For example, an exemplary code segment may be as follows:

```
BinarySearch (array)
{
var left = -1,
right = array.length,
mid;
while(right - left > 1) {
mid = (left + right) >>> 1;
if(array[mid] < item)
left = mid;
else
right = mid;
}
if(array[right] != [city])
return -(right + 1);
return right;
}
```

In the example, the [city] placeholder in the above code segment may be replaced with the token corresponding to the token type [city] in the parsed form.

Figure 4:
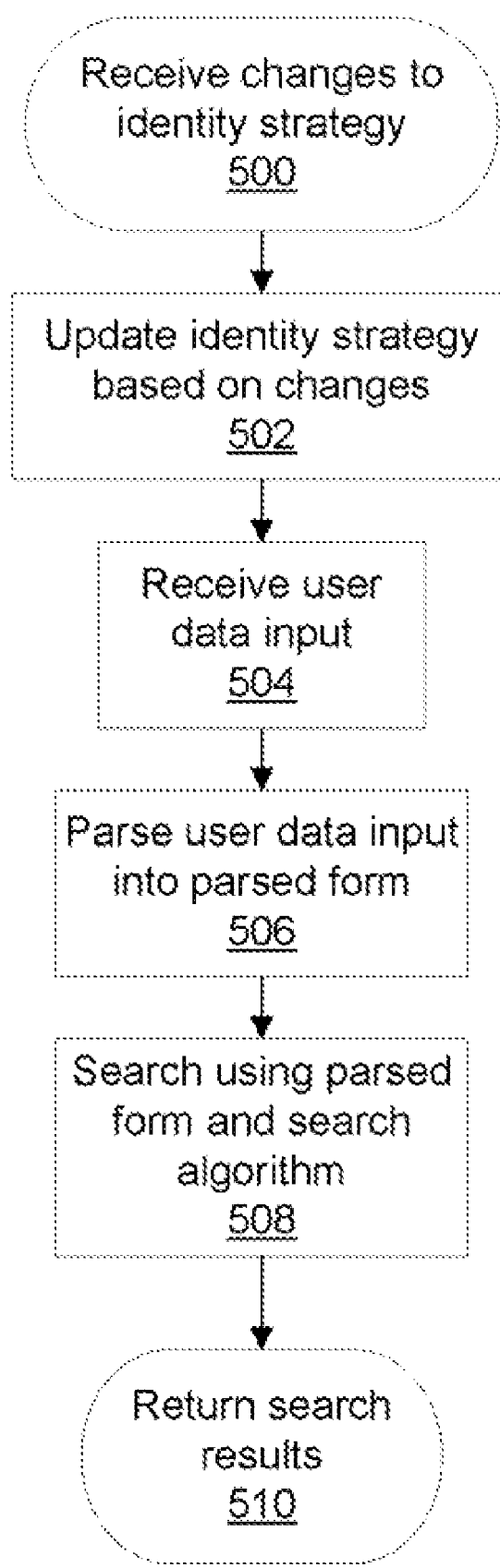
FIG. 4 illustrates a flowchart of illustrative steps of an exemplary embodiment of the present invention.

FIG. 4 illustrates exemplary steps of an embodiment of the present invention. The system may receive changes to an identity strategy (block 500) from a configuring user. The identity strategy, for example, may facilitate entering identification codes for products in an order fulfillment system. The identity strategy may initially be configured to match and search for input data of the form [manufacturer code], [product name]. The configuring user may be presented with a configuration interface (for example, such as that shown in FIGS. 2, 3a, and/or 3b). The configuration interface may display the parsing grammars and search algorithms associated with the identity strategy. For example, the parsing grammar for the above identity strategy may be *[manufacturer code], *[product name]. The user may make changes to the identity strategy, for example, because the potential users may not recall manufacturers by their code numbers. As a result, the configuring user may desire to use the first three letters of the manufacturer's name and the product's name as fields to be entered. The updated parsing grammar may thus be ???[first three letters of manufacturer], *[product name] The configuration interface may send the changes to a configuration engine. The configuration engine may update the identity strategy based on the configuring user changes (block 502). For example, the configuration engine may be operably connected to a file system that includes the identity strategy configuration file. The configuration engine may update the configuration file based on the user changes and save the configuration file.

The system may receive input data from a user (block 504). The user may input data to the system, querying the system to locate records that match the user input. For example, the user may input "son, playstation" desiring to find the product code for the Sony Playstation product. A parsing engine may receive the user input data and parse the data (block 506). The parsing engine may attempt to match the user input with the parsing grammar rules and generate a parsing form. The parsing form may include the literal string tokens and their associated token types derived from the user input data. For example, the rule in the above example ???[first three letters of manufacturer], *[product name] may match the token type [first three letters of manufacturer] with "son", the separator "," and the token type [product name] with "Playstation". The parsing engine may accomplish this by interpreting the first three symbols of the parsing grammar, "???" to indicate that exactly three characters of the input are to be matched. This match may include "son". The parsing engine may then interpret the next symbols, "," to match exactly the characters "," of the input string. The ',' and ' ' may not match either of the special symbols of the parsing grammar, so the parsing engine may interpret these characters to match the symbols themselves. Finally, the parsing engine may interpret the '*' to match the remainder of the string since the symbol '*' may match zero or more characters. The '*' may match "playstation". The parsing engine may associate the matched tokens with their token types as described above.

A search engine may receive the parsed form and perform a search for the user input data in a database (block 508). The search engine may incorporate the parsed form from the parsing engine into the rules for the search algorithm. The search engine may form queries and execute those queries on the database to locate the desired user input data. For example, the database may accept a query object as input where the internal variables correspond to the possible token types. The query object may include methods to set the variables. For example, a method call setFirstThreeLettersOfManufacturer("son") may set the internal variable firstThreeLettersOfManufacturer to "son". Likewise, setProductName("Playstation") may set productName to "PlayStation." The search engine may send the updated query object to the database. The database may perform a search to took for product codes where the first three letters of the manufacturer is "son" and the product name is "Playstation".

The database may return a code ("SPS" for example) to the search engine. The search engine may incorporate the product code in a result set and return the result set to the user (block 510).

Figure 5:
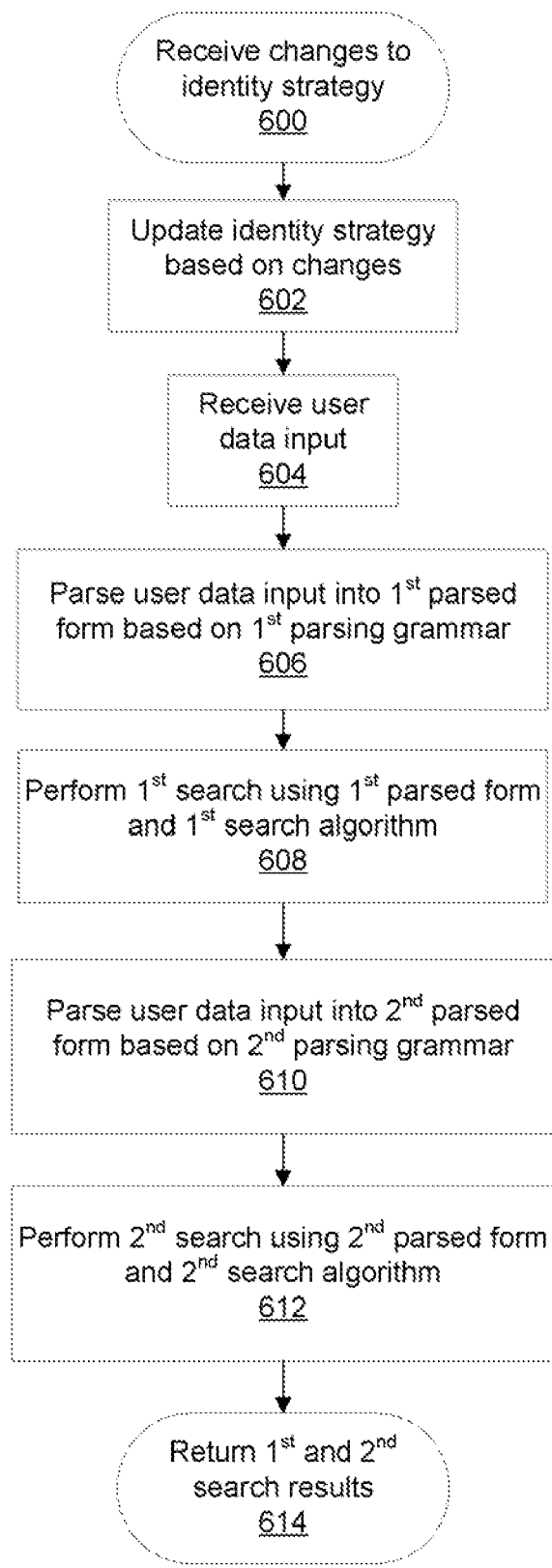
FIG. 5 illustrates a flowchart of illustrative steps of another exemplary embodiment of the present invention.

In FIG. 5, in an alternative embodiment, an identity strategy may include multiple parsing grammars and search algorithms, and the system may return combined results for all searches in a single result set. The system may receive updates to an identification strategy from the configuration user (block 600). The identification strategy may be used by the system to match user input with airport codes, three letter codes that uniquely identify all commercial airports in the world. For example, the identification strategy may initially include a single parsing grammar, *[city] and the corresponding search algorithm that is used to search a database for cities matching the user input. The configuring user may add an additional parsing grammar *[sites] and the corresponding search algorithm that searches the database for popular sites. The configuration engine may update the identification strategy to incorporate the new parsing grammar and search algorithm (block 602). The system may receive user input data (for example "York") from the user (block 604).

The parsing engine may parse the user input data using each of the two parsing grammars. The parsing engine may interpret the '*' in *[city] and match all characters in the input. The parsing engine may associate the input ("York") with the token type [city]. Similarly, moving to the second parsing grammar, *[sites], the parsing engine may match the '*' with all of the characters in the input ("York") and associate the input with the token type [sites]. The parsing engine may generate two parsed forms (blocks 606 and 610).

The search engine may incorporate the two parsed forms into two search queries based on the corresponding search algorithms. For example, the search algorithms associated with the parsing grammars above may be "select AirportCode from Airport_Table where city=[city]" and "select AirportCode from Airport_Table where sites=[sites]". The search engine may perform a search and replace in the first search algorithm to replace [city] with the token associated with the token type [city] ("York"). The search engine may perform the same search replace in the second search algorithm to replace [sites] with the token associated with the [sites] token type ("York"). The search engine may generate two SQL queries, "select AirportCode from Airport_Table where city="York" and "select AirportCode from Airport_Table where Site='York'".

The search engine may search the database for the user input data (blocks 608 and 612). For example, the search for city="York" may retrieve "JFK" and "LGA", the airport codes for John F. Kennedy Airport and Laguardia Airport respectively. A search for "York" in popular sites may yield "LGW" for London's Gatwick Airport, "LHR" for London's Heathrow Airport, and "LCY" for London City Airport, matching "York" with sites in York, England. The search engine may collect the results "JFK" and "LGA" into a result set and return the result set to the user. Alternatively, the search engine may return the results to the user one at a time.

Figure 6:
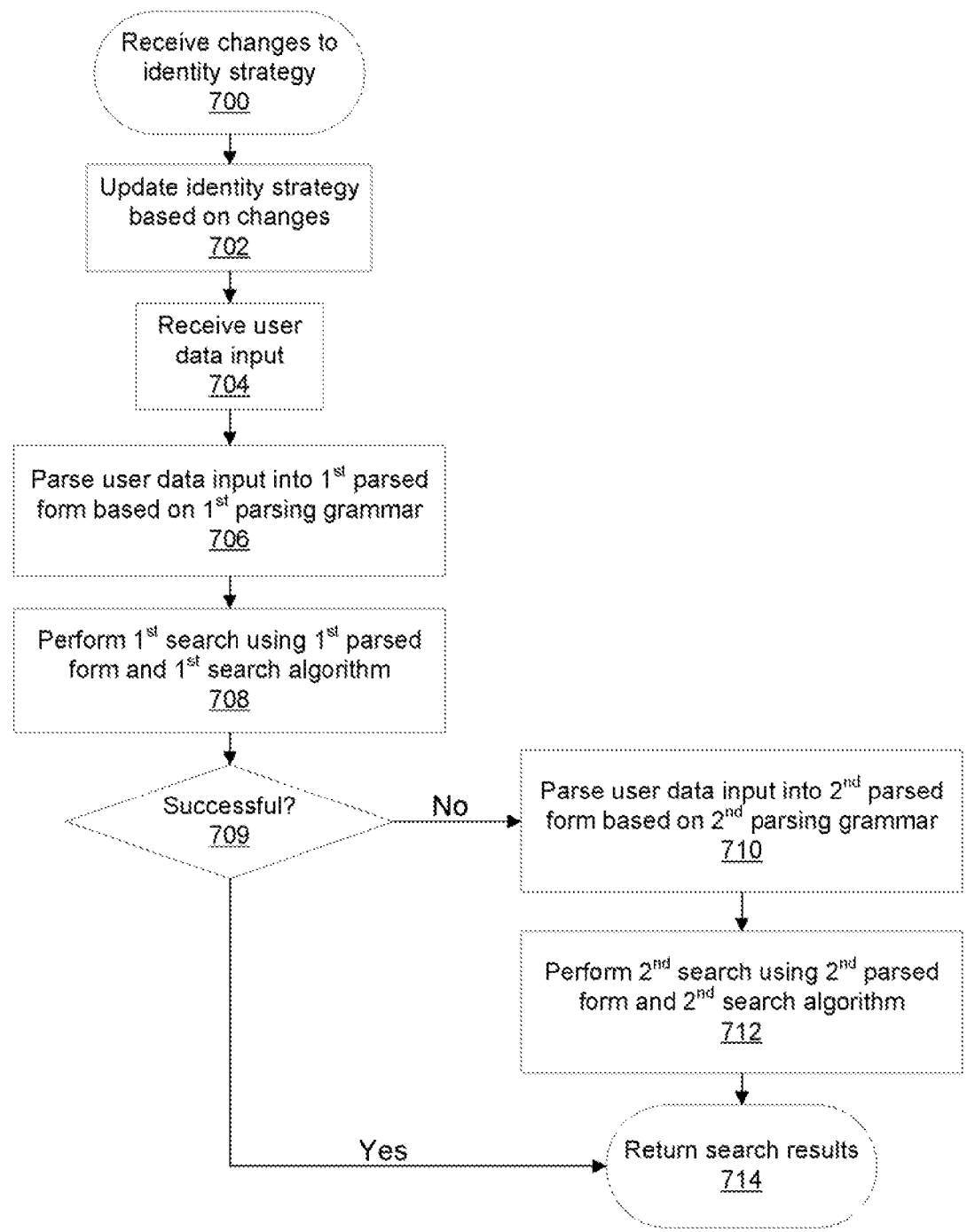
FIG. 6 illustrates a flowchart of illustrative steps of another exemplary embodiment of the present invention.
Figure 7:
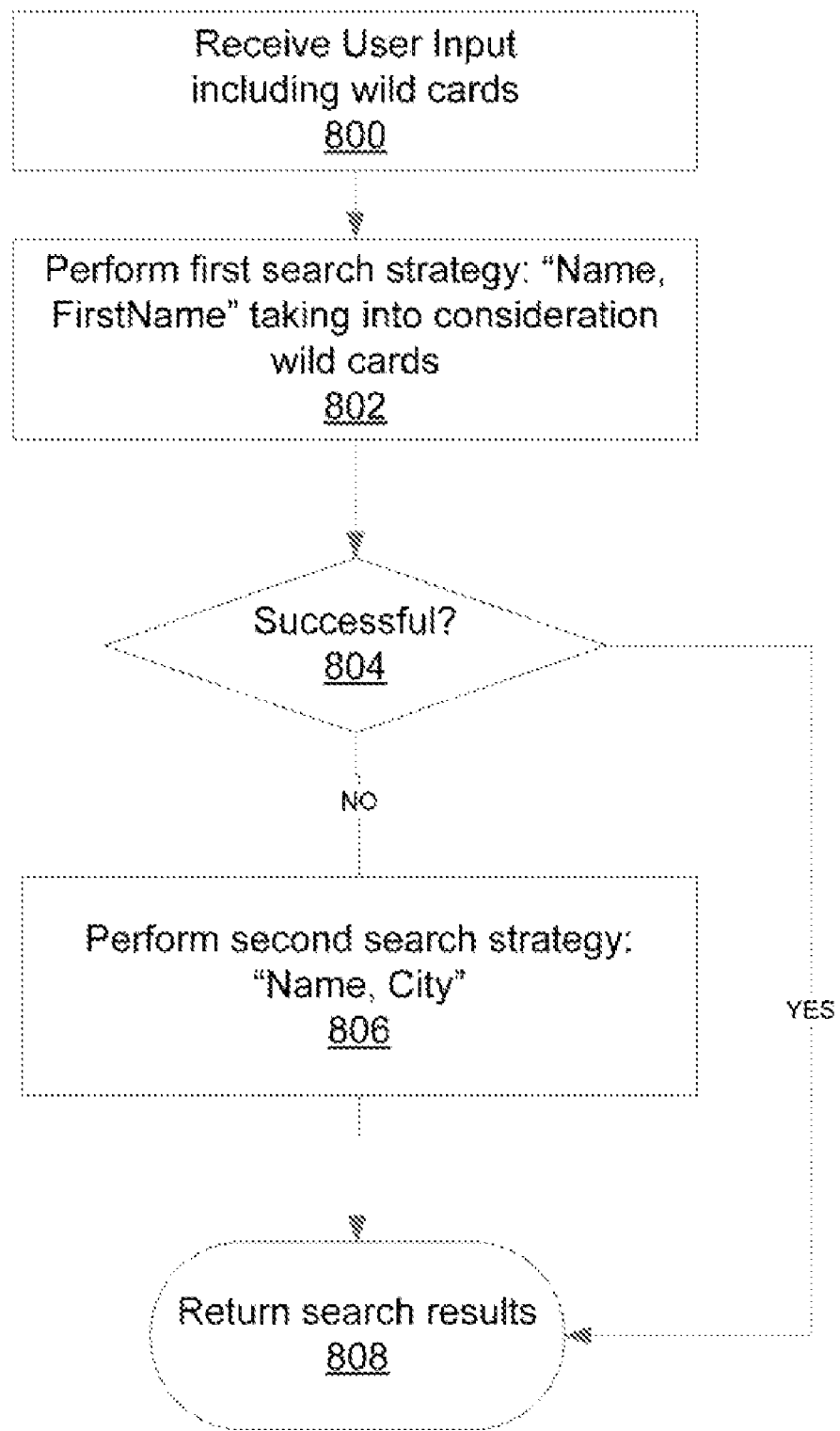
FIG. 7 illustrates a flowchart of illustrative steps of another exemplary embodiment of the present invention.

In FIG. 6, in an alternative embodiment, the parsing and search steps may be performed in a multi-stage fashion in which a second parsing step and search step may be performed if a first parsing step and search step are unsuccessful (block 709). Once the parsing engine performs the parsing steps, generates the parsing grammar, and the search engine executes the search algorithm, a check may be performed to see if the search yielded appropriate results (block 709). Appropriate results may be found in accordance with the specific desire of the system designer; the specific implementation of appropriate results is immaterial to this invention. However, exemplary, appropriate results may be found if the search returns at least one result, if a user indicates to the system that the results are satisfactory, etc.

In another alternative embodiment, in FIG. 8, the user input data may include wild card characters (block 800). This situation may arise if the user is unsure of the exact spelling of the entry data. The parsing engine may enter wild card characters, such as '*', and may incorporate this character into the parsed form. The search engine may interpret the wild card character and translate the character into appropriate instructions that permit a broader search to be performed. For example, if the user enters "Joe *son" in the input field, the parsing engine may match "Joe" with a [first name] token type, the " " with a separator, and "*son" with a [last name] token type. The search engine may perform a search in which the token "*son" is matched with any last name that ends in "son" such as Davidson, Jackson, Albertson, etc. Each of these matches may be incorporated in the results set that is returned to the user. In FIG. 8, a first search strategy using, for example, "Name, FirstName" involving wild cards is performed (block 802). If the search strategy is successful (block 804), then the user is provided with the results 808. If the search strategy is unsuccessful (block 804), then a second search strategy is performed as, for example, "Name, City" (block 806). The results are then displayed/provided to a user (block 808).

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A search method comprising:
   receiving from a first user, through a configuration interface displayed on a computer display, a change to an identification strategy,
      the identification strategy associating a parsing grammar in a data entry field with a search algorithm,
      the parsing grammar comprising:
         parsing grammar rules which split data into a plurality of token names, each token name identifying data in a section of a grammatical statement;
         a plurality of expression formats, at least one expression format preceding each of the plurality of token names, each expression format representing a number of alphanumeric characters of the identified data of the token name that the expression format precedes; and
         a punctuation, the punctuation separating each of the plurality of token names;
      the search algorithm comprising search rules, a search rule producing a query identifying a field in a database to be searched using the data identified by at least one token name in the parsing grammar;
   updating a component of the identification strategy to reflect the change;
   receiving search data in the data entry field from a second user;
   applying the parsing grammar to split the search data by:
      checking whether the entered data contains the punctuation;

checking whether the entered data before the punctuation contains the number of alphanumeric characters required by the expression format for the token name preceding the punctuation; and checking whether the entered data after the punctuation contains the number of alphanumeric characters required by the expression format for the token name following the punctuation; and when the search data satisfies the parsing grammar, applying the search algorithm to produce the query; and executing the query using at least a portion of the search data corresponding to at least one token name.

2. The method of claim 1, wherein the change to the identification strategy includes a change to the parsing grammar.

3. The method of claim 1, wherein the change to the identification strategy includes a change to the search algorithm.

4. The method of claim 1, wherein the application interface includes a text input field.

5. The method of claim 1, wherein the first user and the second user are the same users.

6. The method of claim 1, wherein the identification strategy further associates a second parsing grammar with a second search algorithm.

7. The method of claim 6, further comprising:

receiving from the first user, through the configuration interface displayed on the computer display, a second change to at least one of the second parsing grammar and the second search algorithm;

updating the identification strategy to reflect the second change;

applying the second parsing grammar to split the search data by:
  checking whether the entered data contains the punctuation;
  checking whether the entered data before the punctuation contains the number of alphanumeric characters required by the expression format for the token name preceding the punctuation; and
  checking whether the entered data after the punctuation contains the number of alphanumeric characters required by the expression format for the token name following the punctuation; and when the search data satisfies the parsing grammar, applying the second search algorithm to produce a second query; and executing the second query.

8. The method of claim 6, further comprising:

receiving from the user, through the configuration interface displayed on the computer display, a second change to at least one of the second parsing grammar and the second search algorithm;

updating the identification strategy to reflect the second change; and if a results set produced by executing the query is empty, applying the second parsing grammar to split the search data by:
  checking whether the entered data contains the punctuation;
  checking whether the entered data before the punctuation contains the number of alphanumeric characters required by the expression format for the token name preceding the punctuation; and
  checking whether the entered data after the punctuation contains the number of alphanumeric characters required by the expression format for the token name following the punctuation; and when the search data satisfies the parsing grammar, applying the second search algorithm to produce a second search query; and executing the second search query using at least a portion of the search data corresponding to at least one token name.

9. A search method comprising:

receiving from a first user, through a configuration interface displayed on a computer display, a change to an identification strategy,
  the identification strategy including pairings of parsing grammars in data entry fields and search algorithms,
  each parsing grammar comprising:
    parsing grammar rules which split data into a plurality of token names, each token name identifying data in a section of a grammatical statement;
    a plurality of expression formats, at least one expression format preceding each of the plurality of token names, each expression format representing a number of alphanumeric characters of the identified data of the token name that the expression format precedes; and
    a punctuation, the punctuation separating each of the plurality of token names;
  each search algorithm comprising search rules, a search rule producing a query identifying a field in a database to be searched using the data identified by at least one token name in the parsing grammar;

updating a component of the identification strategy to reflect the change;

receiving search data in the data entry field from a second user;

applying a first parsing grammar from a first identification strategy pairing to split the search data by:
  checking whether the search data contains the punctuation;
  checking whether the search data before the punctuation contains the number of alphanumeric characters required by the expression format for the token name preceding the punctuation; and
  checking whether the search data after the punctuation contains the number of alphanumeric characters required by the expression format for the token name following the punctuation; and when the search data satisfies the parsing grammar, applying a first search algorithm from the first identification strategy pairing to produce a first search query;

executing the first search query using at least a portion of the search data corresponding to at least one token name;

applying a second parsing grammar from a second identification strategy pairing to split the search data by:
  checking whether the search data contains the punctuation;
  checking whether the search data before the punctuation contains the number of alphanumeric characters required by the expression format for the token name preceding the punctuation; and
  checking whether the search data after the punctuation contains the number of alphanumeric characters required by the expression format for the token name following the punctuation;

when the search data satisfies the parsing grammar, applying a second search algorithm from the second identification strategy pairing to produce a second search query;

executing the second search query using at least a portion of the search data corresponding to at least one token name.

10. A search system comprising a computer-readable storage medium storing instructions to be executed by a processor, the instructions, when executed, implementing:

an identification strategy associating a parsing grammar in a data entry field with a search algorithm, the parsing grammar comprising parsing grammar rules which split data into a plurality of token names, each token name identifying data in a section of a grammatical statement;

a plurality of expression formats, at least one expression format preceding each of the plurality of token names, each expression format representing a number of alphanumeric characters of the identified data of the token name that the expression format precedes; and a punctuation, the punctuation separating each of the plurality of token names;

the search algorithm comprising search rules, a search rule producing a query identifying a field in a database to be searched using the data identified by at least one token name in the parsing grammar;

a configuration interface displayed on a computer display, the configuration interface receiving a change to the identification strategy;

a configuration engine which updates the identification strategy to reflect the change;

an application interface displayed on one of the computer display and a second computer display, the application interface receiving search data in the data entry field;

a parsing engine to apply the parsing grammar to split the search data by:

checking whether the entered data contains the punctuation;

checking whether the entered data before the punctuation contains the number of alphanumeric characters required by the expression format for the token name preceding the punctuation; and checking whether the entered data after the punctuation contains the number of alphanumeric characters required by the expression format for the token name following the punctuation;

a query generating engine to apply the search algorithm to produce a search query using at least a portion of the search data corresponding to at least one token name; and a search engine to execute the search query in a database to produce and return a results set.

11. The system of claim 10, wherein the change to the identification strategy includes a change to the parsing grammar.

12. The system of claim 10, wherein the change to the identification strategy includes a change to the search algorithm.

13. The system of claim 10, wherein the application interface includes a text input field.

14. The system of claim 10, wherein the database resides in volatile memory.

15. The system of claim 10, wherein the database resides in nonvolatile memory.

16. The system of claim 10, wherein the configuration interface comprises a first text input field which receives changes to the parsing grammar and a second text input field which receives changes to the search algorithm.

17. The system of claim 10, wherein the punctuation comprises at least one of: a comma, a semi-colon, a period, and a symbol.

18. The system of claim 10, wherein a search algorithm rule is a preliminary form of interpretable code that includes a placeholder for the token.

19. The system of claim 10, wherein the identity strategy further associates a second parsing grammar with a second search algorithm.

20. The system of claim 19, wherein:

the parsing engine further applies the second parsing grammar to split the search data into second search tokens, a second search token associated with one of the search token type and a second search token type;

the query generating engine further applies the second search algorithm to produce a second search query; and the search engine further executes the second search query in the database to produce a second results set.

21. The method of claim 2, wherein updating the identification strategy includes updating the parsing grammar based on the change to the parsing grammar.

22. The method of claim 3, wherein updating the identification strategy includes updating the search algorithm based on the change to the search algorithm.

23. The method of claim 1, wherein the application interface includes a text input field.

24. The method of claim 1, where the expression format comprises at least one of: a symbol representing zero or more alphanumeric characters, a symbol representing at least one alphanumeric character, and a symbol representing exactly one alphanumeric character.

* * * * *